Dec. 20, 1966 A. E. ENGLUND, JR., ETAL 3,293,569

MULTIVIBRATOR WITH ELECTRICALLY VARIABLE PULSE REPETITION FREQUENCY

Filed Jan. 4, 1965 2 Sheets-Sheet 1

INVENTORS:
ARVID E. ENGLUND, JR.
WILLIAM J. LITTLE

BY I David Blumenfeld

THEIR ATTORNEY.

INVENTORS:
ARVID E. ENGLUND, JR.
WILLIAM J. LITTLE,
BY David Blumenfeld
THEIR ATTORNEY.

3,293,569

MULTIVIBRATOR WITH ELECTRICALLY VARIABLE PULSE REPETITION FREQUENCY

Arvid E. Englund, Jr., and William J. Little, Lynchburg, Va., assignors to General Electric Company, a corporation of New York Filed Jan. 4, 1965, Ser. No. 423,164
1 Claim. (Cl. 331—113)

This invention relates to a pulse generator and, more particularly, to a free-running multivibrator which is electrically controlled to vary the pulse repetition frequency.

Free-running or astable multivibrators are well-known pulse generators consisting of a pair of conducting devices which are cross-coupled through an RC circuit to drive the devices alternately into conduction. The RC network, which cross-couples the conductive devices, performs a timing function and normally sets the rate at which the conducting states of the devices are switched and, hence, controls the repetition rate of the pulses generated by the multivibrator. Customarily, once the multivibrator has been designed and the values of the RC components are determined, the repetition rate of the multivibrator is fixed.

A need exists in certain applications for pulse generators of the multivibrator type which may be electrically controlled to vary the repetition rate of the output pulses. Some circuit arrangement must, therefore, be found for electrically varying the values of the components in the RC timing circuit that control the rate at which the conductive devices are switched.

It is, therefore, a primary object of this invention to provide an electrically controlled variable speed multivibrator.

Another object of this invention is to provide a free-running multivibrator wherein the time constant of the timing circuit is electrically varied to control the repetition frequency of the output pulses from the multivibrator.

Still another object of this invention is to provide a multivibrator wherein components of the timing circuit are selectively switched into and out of the multivibrator timing circuit in response to a control signal to vary the repetition rate of the output pulses from the multivibrator.

Other objects and advantages of the invention will become apparent as the description thereof proceeds.

The various objects and advantages of the instant invention are realized by providing a free-running multivibrator in which the resistance of the multivibrator RC timing circuit is electrically controlled to change the time constant of the device. The resistance is varied by providing one or more additional resistors in shunt with the main or primary resistor of the timing circuit. These additional resistors are each connected in series with a diode, and the conductive state of the diodes is controlled in response to an external control signal to selectively connect or disconnect the additional resistors thereby varying the equivalent resistance of the resistor of the multivibrator RC timing circuit.

The novel features, which are believed to be characteristic of this invention, are set forth, with particularity, in the appended claim. The invention itself, however, both as to its organization and mode of operation, together with further objects and advantages thereof, may best be understood by reference to the following description taken in connection with the accompanying drawings in which:

Figure 1:
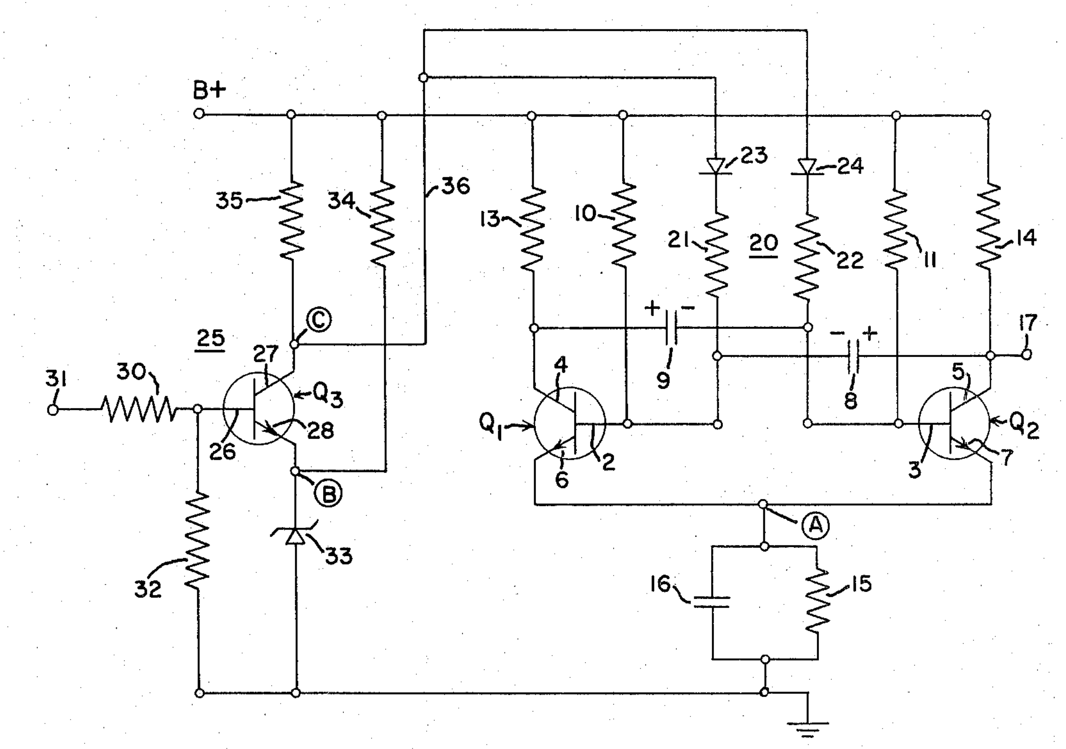
FIG. 1 is a circuit diagram of the variable speed multivibrator.

FIG. 1 illustrates a variable speed multivibrator constructed in accordance with the instant invention wherein the resistance of the multivibrator RC timing circuit is electrically controlled to vary the switching speed of the multivibrator and, hence, the repetition rate of the output pulses. The multivibrator, shown generally at 1, consists of two NPN transistors $Q_1$ and $Q_2$, each transistor being coupled from its collector to the base of the other transistor through a timing network. Transistors $Q_1$ and $Q_2$ include base electrodes 2 and 3, collector-electrodes 4 and 5, and emitter electrodes 6 and 7. The base electrodes are each cross-coupled to the alternate collector through the coupling capacitors 8 and 9 which form part of the timing circuit of the transistor. The transistor bases are returned to a positive supply bus $+E_{BB}$ through resistors 10 and 11 which, with capacitors 8 and 9, form the primary components of the multivibrator timing circuit. Operating potential for the transistors is provided by connecting collectors 4 and 5 to the positive supply bus $+E_{BB}$ through the collector-resistors 13 and 14, and emitters 6 and 7 to a source of reference voltage, such as ground, through the common emitter resistor 15 which is by-passed for A.C. by capacitor 16. An output terminal 17 is connected to collector 5 of transistor $Q_2$.

As thus far described, multivibrator 1 is a perfectly conventional free-running multivibrator with the switching rate between transistors $Q_1$ and $Q_2$ controlled respectively by the RC time constants of resistor 10 and capacitor 8, and resistor 11 and capacitor 9. The transistors conduct alternately and are driven into saturation whenever the base of the transistor becomes more positive than its associated emitter, with the voltage at point A in the emitter circuit being established by the voltage drop across emitter-resistor 15. The base return and timing resistors 10 and 11 are substantially larger than collector-resistors 13 and 14 so that the capacitor connected to the collector of the nonconducting transistor charges rapidly to the supply voltage $+E_{BB}$ whereas the capacitor connected to the collector of the saturated or conducting transistor, which has previously been charged to $E_{BB}$, discharges at a much slower rate through its associated base return resistor.

To vary the switching speed of the multivibrator, and hence the repetition rate of the output pulses at terminal 17, an alternate network is connected to the transistor bases, shown generally at 20. The network includes additional timing resistors 21 and 22 connected in series with diodes 23 and 24, respectively. The series combination of resistor 21 and diode 23 is connected to the junction of base 2 and capacitor 8, and resistor 22 and diode 24 are connected in series to the junction of capacitor 9 and base 3.

Diodes 23 and 24 are selectively biased into conduction to connect resistors 21 and 22 in shunt with resistors 10 and 11 to vary the equivalent resistance and thereby the time constant of the timing circuit and the operating speed of the multivibrator. To this end, a control circuit 25 is provided for diodes 23 and 24 which selectively biases these diodes into conduction. Circuit 25 includes an NPN transistor switch $Q_3$ which has a base 26, a collector 27, and an emitter 28. Control signals at terminal 31 are coupled to base 26 through resistor 30 and control the conductive state of transistor $Q_3$ and thereby diodes 23 and 24. Base 26 is returned to ground by base return resistor 32. The emitter voltage $V_B$, at point B in the emitter circuit, is fixed at a value established by the reverse breakdown voltage of a voltage reference device, such as a Zener diode 33, connected between emitter 28 and ground and dropping resistor 34 connected to the positive bus $E_{BB}$. Voltage $V_B$ is positive with respect to ground but is less positive than voltage $V_A$ at point A in the emitter circuit of the multivibrator to obtain positive switching of the diodes. Operating potential for collector 27 is obtained by means of collector-resistor 35 connected to the $+E_{BB}$ bus.

The voltage $V_C$ at point C in the collector circuit of $Q_3$ controls diodes 23 and 24, the anodes of which are connected to this point by common lead 36. A positive voltage at input terminal 31, which is greater than the positive voltage $V_B$ at point B in the emitter circuit, forward-biases the base-emitter junction of $Q_3$ and switches the transistor into saturation. The voltage $V_C$ at the collector is thereby held essentially at the value of the emitter reference voltage $V_B$, and diodes 23 and 24 are not forward-biased. Whenever the voltage at input terminal 31 drops below the emitter reference voltage $V_B$, the base emitter junction of $Q_3$ is reverse-biased, driving $Q_3$ to cut-off, so that the collector voltage $V_C$ rises essentially to the value at the $E_{BB}$ bus. Whenever the voltage at point C rises to $E_{BB}$, diodes 23 and 24 are forward-biased, and resistors 21 and 22 are connected in shunt with the main timing resistors 11 and 12 through diodes 23 and 24, lead 36 and $Q_3$ collector-resistor 35. The equivalent resistance of the multivibrator timing circuit is reduced increasing the switching speed of the multivibrator and the repetition rate of the output pulses at terminal 17. Thus, the speed of the multivibrator is controlled by an electrical control signal, and the repetition rate of the output pulses is correspondingly varied.

Figure 2:
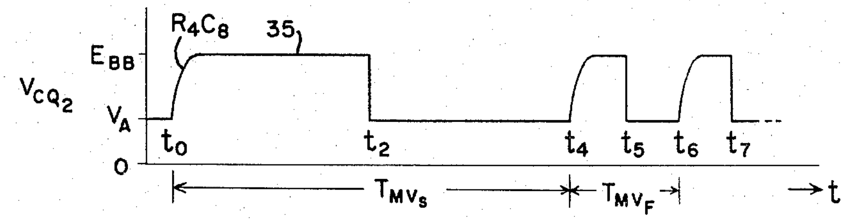
FIGS. 2–7 are wave form diagrams illustrating conditions at the various points in the multivibrator circuit of FIG. 1 and which are useful in understanding the operation of the multivibrator.

The manner in which the multivibrator is electrically controlled to vary its speed and the output pulse rate may best be understood in connection with the diagrams of FIGS. 2–7 which represent the wave forms at the bases and collectors of transistors $Q_1$, $Q_2$, and $Q_3$. Assume that at some time $t=0$, transistor $Q_2$ is in the conducting state, and transistor $Q_1$ is in the nonconducting state. Also, a sufficiently positive potential is present at input terminal 31 so that $Q_3$ is in saturation, and the collector voltage $V_C$ is equal to $V_B$, and multivibrator 1 runs in its slow mode. With transistor $Q_2$ conducting and in saturation, the collector-emitter resistance of the transistor is very low, and the voltage drop across the transistor is so small that the voltage at the collector is essentially equal to the voltage $V_A$ at the emitter. Curve 35 of FIG. 2 shows the voltage $V_CQ_2$ at the collector of $Q_2$ as equal to $V_A$. The voltage at the collector of transistor $Q_1$, $V_CQ_1$, in FIG. 4, on the other hand, is approximately at $+E_{BB}$ since $Q_1$ is cut off, and the voltage drop across collector-resistor 13 is very small. The potential at base 3 of transistor $Q_2$, $V_BQ_2$, is more positive than the emitter voltage $V_A$, as shown by curve 37 of FIG. 3, maintaining $Q_2$ in the saturated state. During the time interval $t=0$ to $t=t_0$, the potential $V_BQ_1$ at base 2 of $Q_1$ has been slowly rising as capacitor 8 discharges through resistor 10, as shown by curve 38 of FIG. 5.

Assume that at $t=t_0$, $V_BQ_1$ has risen sufficiently so that the base of $Q_1$ is more positive than the emitter potential $V_A$. $Q_1$ is then driven into conduction, and $Q_2$ is driven to cut-off. As $Q_2$ is cut off, the voltage at collector 5 rises from $V_A$, the value of emitter voltage, toward the voltage at the positive bus $E_{BB}$. Capacitor 8 charges to the voltage of $E_{BB}$ with the polarity shown at a rate determined by the time constant of resistor 14 and capacitor 8. Since, as pointed out previously, the value of collector-resistor 14 is very small compared to the value of the primary resistors, the rate at which capacitor 8 charges and at which the voltage at the collector 5 rises to $E_{BB}$ is very rapid and is represented by the portion of curve 35 of FIG. 2 designated $R_{14}C_8$. During the interval that $Q_1$ was cut off, capacitor 9 charged up to the full supply voltage $E_{BB}$ with the polarity shown in FIG. 1. The moment $Q_1$ is driven into conduction, the voltage at collector 4 of $Q_1$ drops from $E_{BB}$ to the voltage $V_A$ at its emitter. Since capacitor 9 cannot discharge instantaneously, the only path being through timing resistor 11, base 3 of collector $Q_2$ is instantaneously driven negative. With collector 4 of $Q_1$ at $+V_A$, the voltage at the base of $Q_2$ becomes $|V_A-E_{BB}|$. As $E_{BB}$ is larger than $V_A$, it can be seen from curve 37 of FIG. 3 that at $t=t_0$, base 3 is driven substantially more negative than its emitter, and $Q_2$ is cut off. Capacitor 9 now begins to discharge through the main timing resistor 11. Initially, diode 24 is also driven into conduction to permit partial discharge of capacitor 9 through alternate resistor 22 and $Q_3$ collector-resistor 35 as well.

Figure 3:
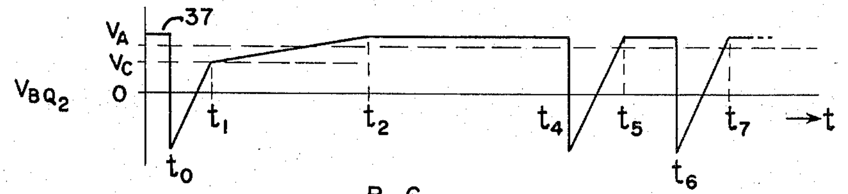
Figure 4:
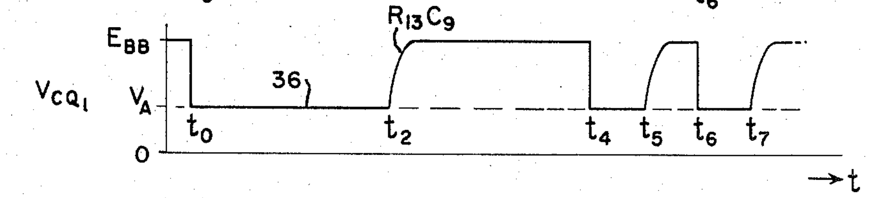
Figure 7:
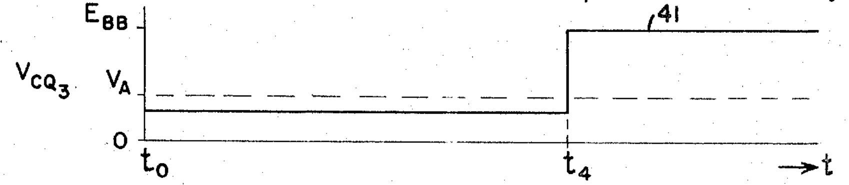

It will be recalled that with a positive control signal at terminal 31, the voltage $V_C$ at the collector of $Q_3$ is positive, as may be seen from curve 41 of FIG. 7, but less positive than the voltage $V_A$ at point A in the multivibrator emitter circuit. The anode of diode 24 is, therefore, at a positive voltage with respect to ground. The cathode is connected to base 3 of $Q_2$ which, as may be seen from FIG. 2, is negative with respect to ground. Diode 24 is thus forward-biased and conducts, and capacitor 9 discharges through resistors 11, 22, and 35, at a fairly rapid rate, as shown in FIG. 3 by the steeply rising portion of curve 37 between $t_0$ and $t_1$. At some point in time $t_1$, capacitor 9 has discharged sufficiently so that the potential at the junction of base 3 and resistor 22 is now equal to or slightly more positive than the voltage $V_C$ at the collector of $Q_3$. Diode 24 is now reverse-biased, disconnecting resistor 22 from the discharge path and, hence, from the timing circuit of the multivibrator. Capacitor 9 now continues to discharge through main discharge resistor 11, the resistance of which is substantially greater than the equivalent resistance of resistors 11, 22, and 35 in shunt, so that the discharge rate is substantially reduced. The time period required for the capacitor to discharge sufficiently for base 3 to become more positive than the emitter voltage $V_A$ is now determined by the time constant $C_9R_{11}$ which is substantially greater than before. This may be seen in FIG. 3 by the portion of curve 37 between $t_1$ and $t_2$. At $t_2$, capacitor 9 has discharged sufficiently so that base 3 of $Q_2$ is now more positive than $V_A$, forward-biasing the base emitter junction and driving $Q_2$ into conduction and saturation. The collector of $Q_2$ drops from $E_{BB}$ to $V_A$ as may be seen in FIG. 2. Simultaneously, $Q_1$ is driven into cut-off, and the voltage at its collector, as shown in curve 36 of FIG. 2, rises from $V_A$ towards $E_{BB}$ at a rate determined by the time constant $C_9R_{13}$ of collector-resistor 13 and capacitor 9. Capacitor 9 similarly charges up to the value of the supply voltage $E_{BB}$ when $Q_1$ is cut off.

In time interval from $t_0$ to $t_2$, during which $Q_2$ has been cut off, capacitor 8, of course, charges to the full value of the supply voltage $E_{BB}$. At $t_2$ when $Q_2$ conducts, the potential $V_BQ_1$ at the base of $Q_1$ is driven negative, as shown in curve 38 of FIG. 5. This occurs because the voltage $V_CQ_2$ at collector 5 drops almost instantaneously from $E_{BB}$ to $V_A$ while capacitor 8 cannot discharge instantaneously. Consequently, base 2 of $Q_1$ is driven negative with respect to its emitter. Capacitor 8 now begins to discharge. From $t_2$ to $t_3$, diode 23 conducts since its cathode is more negative than its anode, rapidly discharging capacitor 8 through resistors 10, 21 and 35, until the voltage at the junction of base 2 and resistor 21 becomes more positive than the voltage $V_C$ at the collector of $Q_3$. This reverse-biases the diode, disconnecting resistor 21 from the discharge path, and capacitor 8 continues to discharge at a rate determined by the resistance of resistor 10. The slow discharge of capacitor 8 continues until at time $t_4$, base 2 once more becomes more positive than the emitter, and $Q_1$ is driven into saturation, and $Q_2$ is cut off.

Figure 5:
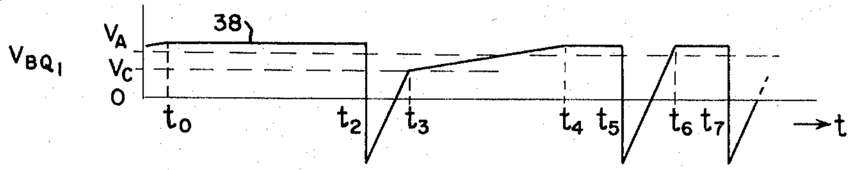
Figure 6:
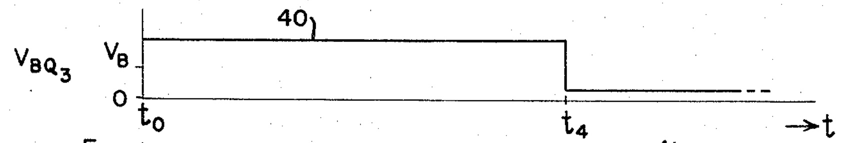

As long as the positive control voltage at input terminal 31 exceeds the voltage $V_B$ at the emitter of $Q_3$, as shown by curve 40 of FIG. 6, diodes 23 and 24 conduct only temporarily, and the rate at which the multivibrator operates is approximately that shown in FIG. 2 by the pulse period $T_{MSV}$ which represents the slow operating mode of the multivibrator. If at time $t_4$, the positive control voltage at input terminal 31 is reduced to a value less than the emitter voltage $V_B$, $Q_3$ is cut off since its base emitter junction is now reverse-biased. The voltage $V_C$ a point C in the collector circuit of $Q_3$ rises from a value less than $V_A$ to approximately the value at the positive bus $E_{BB}$. With the voltage at point C being $V_C \cong E_{BB}$, the anodes of diodes 23 and 24 are positive with respect to the cathodes during the entire operative cycle and additional timing resistors 21 and 22 are permanently connected in shunt with the main timing resistors 10 and 11 through the diodes and through $Q_3$ collector-resistor 35. The discharge time of capacitors 8 and 9 is now determined by the equivalent resistance of the parallel combination of resistors, which equivalent resistance is much lower than the resistance of the resistors 11 and 12. Hence, as shown in FIGS. 3 and 5, the discharge of capacitors 8 and 9 and the rate at which the base voltages rise during intervals $t_4$–$t_5$, $t_5$–$t_6$, $t_6$–$t_7$, etc., is much more rapid. The switching time of the transistors $Q_1$ and $Q_2$ is reduced substantially, as may be seen from curves 35 and 36 of FIGS. 2 and 4. The multivibrator period $T_{MVF}$ is reduced, and the repetition rate of the output pulses from the multivibrator is increased. The multivibrator remains in this high speed mode as long as the input signal at terminal 31 remains below $V_B$ so that the collector voltage $V_C$, shown by curve 41 of FIG. 7, is approximately at $E_{BB}$. Whenever the voltage at terminal 31 becomes more positive than $V_B$, the free-running multivibrator again reverts to a slow operating mode, and the repetition rate of the output pulse is reduced.

It will be seen from this description and the wave forms of FIGS. 2 to 7 that a simple and effective arrangement for varying the operating speed of a free-running multivibrator has been provided by electrically controlling the time constant of the timing network of the multivibrator.

A variable speed multivibrator, such as the one shown in FIG. 1, was constructed and found to operate in the manner described. The following is a tabulation of the component values of the multivibrator so constructed. These values are given by way of example only and are not considered to be in any way limiting of the invention. The multivibrator thus constructed operated at a rate of approximately four cycles per second in the slow running mode and approximately thirty cycles per second in the fast running mode.

| | |
|---|---|
| $R_{10}$=390 kilohms | $R_{30}$=10 kilohms |
| $R_{11}$=390 kilohms | $R_{32}$=30 kilohms |
| $R_{13}$=8.2 kilohms | $R_{34}$=3.3 kilohms |
| $R_{14}$=8.2 kilohms | $R_{35}$=7.5 kilohms |
| $R_{15}$=3.9 kilohms | $C_8$=.5 farad |
| $R_{21}$=56 kilohms | $C_9$=.5 farad |
| $R_{22}$=56 kilohms | $C_{16}$=20 farads |

$Q_1$, $Q_2$, $Q_3$=19A115123–1, similar to 2N2712
Diodes 23, 24=19A115250–1, silicon diode
Zener diode 33=4036887–2, Zener diode 2.8 v.
$E_{BB}$=+10 volts It will still be appreciated by those skilled in the art that many changes in the component values and devices may be made in order to control the precise speed at which the multivibrator device operates both in its fast and slow modes. Obviously, the relative values of the primary additional timing resistors and the timing capacitors will control the actual speed. Only certain relationships have to be maintained in a general way in order for the device to operate successfully. That is, collector-resistors 13 and 14 should be substantially smaller than the primary timing resistors 10 and 11 in order to permit the capacitors 8 and 9 to charge rapidly to the supply voltage when their associated transistor is cut off. Furthermore, the resistance of primary resistors 11 and 12 should be small enough to assure that the transistors are saturated when they are conducting. Additional timing resistors 21 and 22 are, of course, chosen to have values such that the equivalent resistance of the network with the resistors in shunt produces the desired speed of operation.

One additional advantage flowing from the use of diodes 23 and 24 in the slow operating mode is that the diodes also function to protect the transistor against excessive base emitter reverse voltages. It will be recalled that in the slow operating mode when a positive voltage is applied to input terminal 31, one or the other of diodes 23 and 24 is driven into conduction for at least part of the operation cycle to provide rapid discharge of the capacitor until the voltage at the transistor base is more positive than the voltage $V_C$ at the collector of $Q_3$. This insures that when the base of the nonconducting transistor is driven negative, that the reverse-bias is impressed across the base emitter junction for a very short time only, thereby minimizing avalanche effects or other damage to the transistor which may occur if an excessively large reverse-biasing voltage is applied to the base emitter for an excessive period of time. This is a problem which is particularly significant for example with alloy junction transistors, and the customary technique to avoid this problem is to connect individual diodes across the base emitter junction to limit the reverse-bias. In the instant circuit, the switching diodes 23 and 24 provide this additional protective function by rapidly discharging any reverse-biasing voltage before it has an opportunity to do damage.

Although a number of specific embodiments of the invention have been shown, it will, of course, be understood that the invention is not limited thereto since many modifications, both in the instrumentalities and circuit arrangement employed, may be made. It is contemplated by the appended claim to cover any such modifications which fall within the true spirit and scope of this invention.

What is claimed as new and desired to be secured by Letters Patent of the United States is:

In an electrically controlled variable-speed multivibrator for producing output pulse trains at two distinct repetition rates, the combination comprising:

(a) first and second transistors, each having collector, emitter and base electrodes;

(b) timing circuit means for establishing regenerative feedback paths between the collector of said first transistor and the base of said second transistor, and the collector of said second transistor and the base of said first transistor to establish the normal operating speed of the multivibrator for producing a pulse train having a first repetition rate, said last named means including a capacitor connected between the collector of said first transistor and the base of said second transistor, and a primary timing resistor, connected from the base of said second transistor to a point of potential to provide a discharge path for said first capacitor, and a further capacitor and a further primary timing resistor connected respectively between the collector of said second transistor and the base of said first transistor and the base of said first transistor and said point of potential;

(c) two further timing resistors adapted to be connected in shunt with said primary timing resistors to vary the time constant of the timing circuit means and the pulse repetition rate of the output pulses from said multivibrator, and (d) electrically activated switch means, including diodes connected in series with said further resistors, said diodes conducting temporarily, whereby timing for the normal operational speed is established essentially by the time constant of said capacitors and primary resistors, (e) a third transistor having input, output, and common electrodes, a constant voltage reference element connected between the common electrode and a point of reference potential, said third transistor being adapted to receive a control signal at its input electrode to change its conducting state, means coupling the diodes to the output electrode of said third transistor whereby said diodes are continually forward-biased in response to said control signal for continually connecting said further resistors in shunt with the primary resistance for the duration of said control signals, thereby varying the equivalent resistance of said timing circuit and the operating speed of the multivibrator to produce a pulse train having a different repetition rate.

References Cited by the Examiner

UNITED STATES PATENTS

| | | | |
|---|---|---|---|
| 3,129,391 | 4/1964 | Kabell | 331—113 |
| 3,152,306 | 10/1964 | Cooper et al. | 331—113 |

FOREIGN PATENTS

| | | |
|---|---|---|
| 1,245,754 | 10/1960 | France. |
| 1,139,876 | 11/1962 | Germany. |

OTHER REFERENCES

J. Kyle, Electronics World, "Electronic Sirens," pages 32, 33, April 1964.

ROY LAKE, *Primary Examiner.*

J. KOMINSKI, *Assistant Examiner.*